United States Patent [19]

Muecke et al.

[11] 3,717,217
[45] Feb. 20, 1973

[54] MECHANISMS FOR MOUNTING AND STOWING SEISMIC VIBRATORS ON A VEHICLE

[75] Inventors: Kurt H. Muecke; Marchall A. Milnes, both of Calgary, Alberta, Canada

[73] Assignee: Flextrac Nodwell Ltd., Calgary, Alberta, Canada

[22] Filed: June 5, 1970

[21] Appl. No.: 43,711

[52] U.S. Cl............................181/.5 VM, 181/.5 BC
[51] Int. Cl..............................................G01v 1/14
[58] Field of Search..........181/.5 VM, .5 BC; 214/77

[56] References Cited

UNITED STATES PATENTS

| | | | |
|---|---|---|---|
| 2,772,746 | 12/1956 | Merten | 181/.5 VM |
| 3,363,720 | 1/1968 | Mifsuo et al. | 181/.5 VM |
| 3,095,099 | 6/1963 | Costello | 181/.5 VM |
| 3,550,719 | 12/1970 | Meister | 181/.5 VM |
| 2,874,795 | 2/1959 | Doty et al. | 181/.5 VM |
| 2,633,781 | 4/1953 | Day | 181/.5 VM |
| 3,106,982 | 10/1963 | Wade | 181/.5 VM |

*Primary Examiner*—Benjamin A. Borchelt
*Assistant Examiner*—N. Moskowitz
*Attorney*—Christen and Sabol

[57] ABSTRACT

A vehicle particularly a tracked vehicle adapted to carry at least one seismic vibrator and including a mechanism adapted to mount a carrier frame structure for the vibrator on the vehicle for positive displacement of the vibrator between an extended operative position overlying the ground and a retracted stowed position overlying a portion of the vehicle. The mechanism adapted to mount the carrier frame structure comprise a linkage arrangement defining a parallelogram configuration pivotally connected to the vehicle frame and the carrier frame structure actuated by two hydraulic cylinders and arranged for positive and bodily displacement of the carrier frame structure and the vibrator.

8 Claims, 3 Drawing Figures

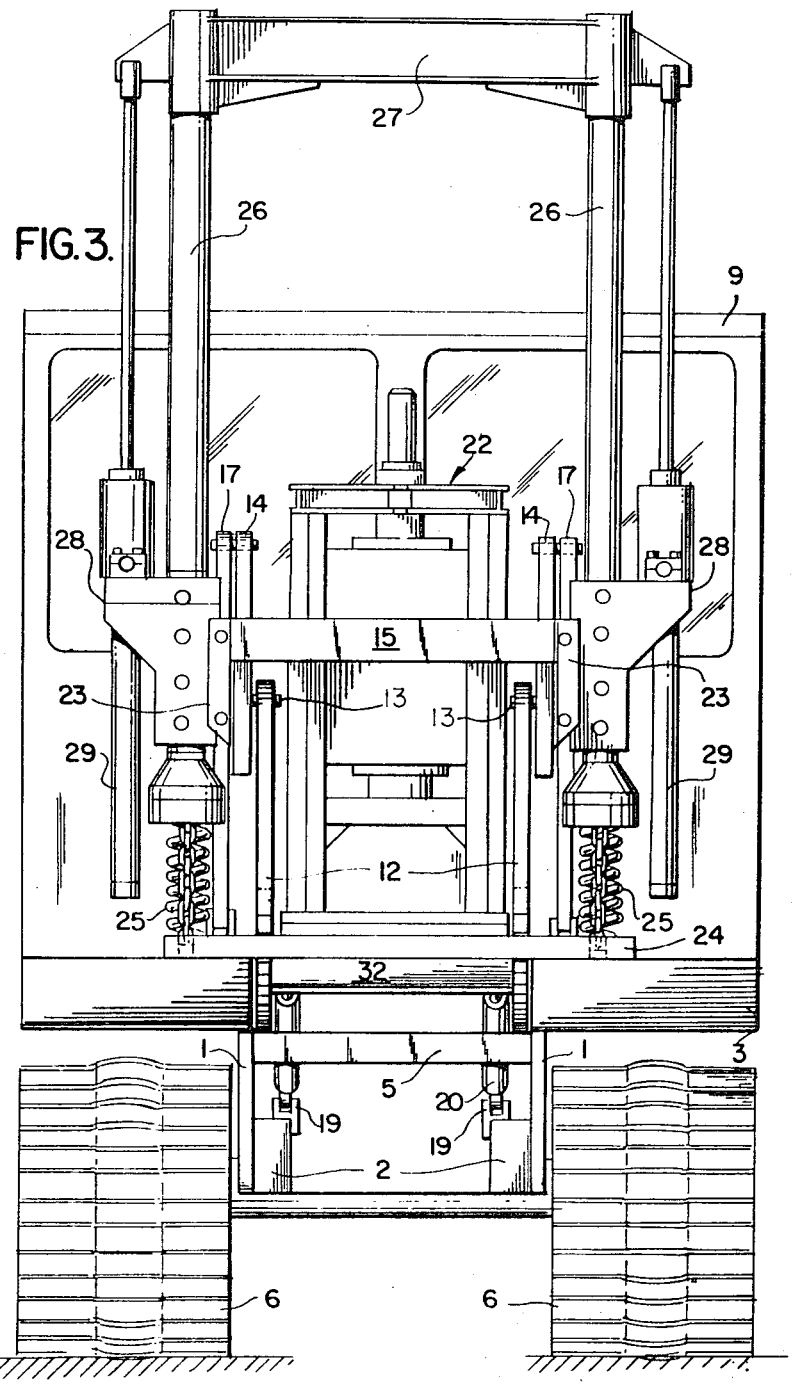

MECHANISMS FOR MOUNTING AND STOWING SEISMIC VIBRATORS ON A VEHICLE

The present invention relates to a mechanism adapted to vehicle having a frame means and adapted for seismic prospecting using at least one seismic vibrator, the combination comprising at least one linkage mechanism including a carrier frame structure constructed and arranged to positively carry the one seismic vibrator for bodily displacement therewith, linkage means pivotally connected to the frame means and to the carrier frame structure and constructed and arranged to positively guide and translate the carrier frame structure relative to the frame means to cause the bodily displacement of the carrier frame structure and the one seismic vibrator between a position overlying the ground and a position overlying a portion of the frame means, and an actuator connected to the linkage mechanism and constructed and arranged to actuate the linkage means such that the seismic vibrator mounted on the carrier frame structure can be stowed on said portion of the frame means.

Such vehicles have been adapted to carry the vibrator either intermediate the front and the rear axles or on a cantilever projection fixed to the rear of the vehicle. In all cases, the vehicle is merely adapted to raise and lower the seismic vibrator relative to the ground surface. In the case of conventional two-track vehicles, it is not feasible to mount the vibrator intermediate the ends of the tracks since this would interfere with the latter. On the other hand, a fixed cantilever projection at one end of a tracked vehicle impairs the performance and maneuverability of the vehicle. The vibrators carried on a fixed cantilever projection extend rearwardly or frontwardly at only a limited height above the level of the lower run of the tracks. In use on uneven terrain, this represents a major inconvenience since the vibrator may contact obstructions such as ditches, stumps, rock ledges, creek beds, muskeg or the like. Another disadvantage of transporting a seismic vibrator on a fixed cantilever projection is the high bending moment imposed on the frame by the relatively heavy vibrator.

It is the general object of the present invention to provide a vehicle adapted for seismic prospecting which does not have the aforementioned disadvantages. According to the invention there is provided, in a vehicle adapted for seismic prospecting and having a frame means, at least one linkage mechanism comprising a seismic equipment carrier means, a connecting linkage means pivotally connected to the frame means and to the seismic equipment carrier means, said connecting linkage means being constructed and arranged to translate said seismic equipment carrier means between a position overlying the ground and a position overlying a portion of the frame means such that the seismic equipment mounted on the carrier means can be stowed on said portion of the frame means.

More specifically, said linkage means on each side of the carrier frame structure comprises a linkage arrangement having a first link and a second link, each pivotally connected at one end to the frame means and at the other end to the carrier frame structure, and, in a preferred construction, the linkage arrangement on each side of the carrier frame structure defines in cooperation with the latter and the frame means, a parallelogram-type linkage connection.

With the vehicle according to the invention the carrier frame structure and a seismic vibrator carried thereon, can be displaced to a stowed position on the vehicle in which they, are not likely to contact any ground obstruction and no additional substantial bending moments are applied to the vehicle frame. Furthermore, the parallelogram-type linkage connection causes positive translational and bodily displacement of the carrier frame structure and the vibrator with the latter in the upright position thereby avoiding additional support or care which would otherwise be required to displace the vibrator in any manner or position.

According to a preferred embodiment of the invention, a tracked vehicle is adapted with two vibrators advantageously mounted at opposite ends thereof respectively and arranged to be simultaneously operated thereby constituting an advantageous arrangement for efficient seismic prospecting.

The invention will now be described, by way of example, with reference to the accompanying drawings in which an embodiment of the invention is illustrated and wherein:

FIG. 3 is an end elevation of the vehicle of FIG. 2 showing a seismic vibrator assembly operatively associated to the mechanism of the invention.

Figure 1:
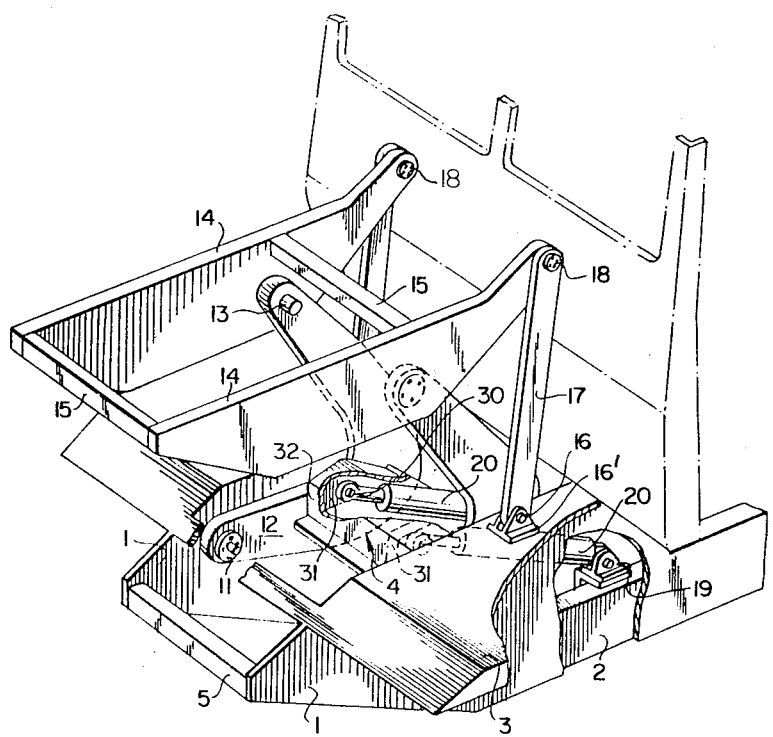
FIG. 1 is a front perspective view of a carrier frame structure and connecting linkage means mounted on the frame of a vehicle according to the embodiment of the invention.

The drawings illustrate the invention as particularly adapted to a tracked vehicle of a specific outline. Obviously, the invention is also applicable to other types of vehicles and to tracked vehicles of different outlines. The tracked vehicle illustrated comprises a frame including a pair of vertical plates 1 mounted parallel to each other longitudinally of the vehicle. Each plate 1 is fixed along its lower edge to a beam 2. A platform 3 having a central cut out 4 at each end of the vehicle is fixed substantially horizontally on the top edge of the vertical plates 1 and projects laterally outwardly relative thereto. At each end of the vehicle, a transverse brace 5 extends between the two vertical plates 1 and is fixed to the latter to give rigidity to the end portions of the plates. The illustrated tracked vehicle comprises other conventional parts such as tracks 6, load bearing wheels 7, sprocket 8 and cab 9. The box 10 (FIG. 2) represents the general location of the auxiliary equipment needed to operate seismic vibrators mounted on the vehicle. The nature, kind, construction and exact location of the auxiliary equipment does not form part of the present invention and is not defined further in this specification.

On the inner side of each vertical plate 1, near the ends thereof, there is pivotally mounted, on a pivot 11, one end of a goose neck link 12 the other end of which is pivotally connected, by a pivot 13, on the inner side of a carrier link 14. A pair of crossbars 15 are fixed transversely between each pair of carrier links 14. Each pair of links 14 and each pair of crossbars 15 together define a rigid seismic vibrator carrier frame structure. Brackets 16' are mounted on top of the platform 3 on each side and toward the rear of each cut out 4. A connecting link 17 is provided for each bracket 16' and is pivotally connected at one end, by a pivot 16, to the corresponding bracked 16' and, at its other end by a pivot 18, to a rear extension of an associated carrier link 14. At each end of the vehicle, a bracket 19 is attached to each beam 2 and an hydraulic actuator or ram 20 is pivotally connected at one end to the bracket 19. The free end of the piston rod of the hydraulic cylinder or ram 20 is provided with a transverse pivot pin 30 pivotally mounted between a pair of spaced plates 31 welded or otherwise fixed to a cover 32 rigidly joining each pair of parallel goose neck links 12 intermediate the ends thereof.

The two seismic vibrators which are proposed to be used with the present invention are manufactured by the Westinghouse Air Brake Company and they each comprise a lift assembly and a vibrator hydraulic shaker assembly. The latter is shown only in outline form and identified by numeral 22 in FIGS. 2 and 3. The carrier frame structure shown in FIGS. 2 and 3 is adapted to carry the vibrator hydraulic shaker assembly 22 and includes mount brackets 23,23 adapted to be fixed to the carrier links 14,14 in any conventional manner as by welding or bolting.

Essentially the lift assembly comprises a base 24 suspended at each end by suspension units 25 from a pair of columns 26 rigidly fixed in parallel relationship by means of a cross-beam 27. The columns 26 are slidably mounted vertically in a pair of supporting brackets 28 on the mount brackets 23. Hydraulic cylinders 29 are located on each side of the lift assembly adjacent the columns 26 and are connected between the supporting brackets 28 and the cross beam 27, such that energization of the cylinders 29 will cause either elevation or descent of the crossbeam 27, the suspended columns 26, the suspension units 25 and the base 24. Such elevation or descent causes the vibrator hydraulic shaker assembly 22 carried on the base 24 to be lifted or lowered relative to the ground and to the vehicle on which the lift assembly is mounted.

Figure 2:
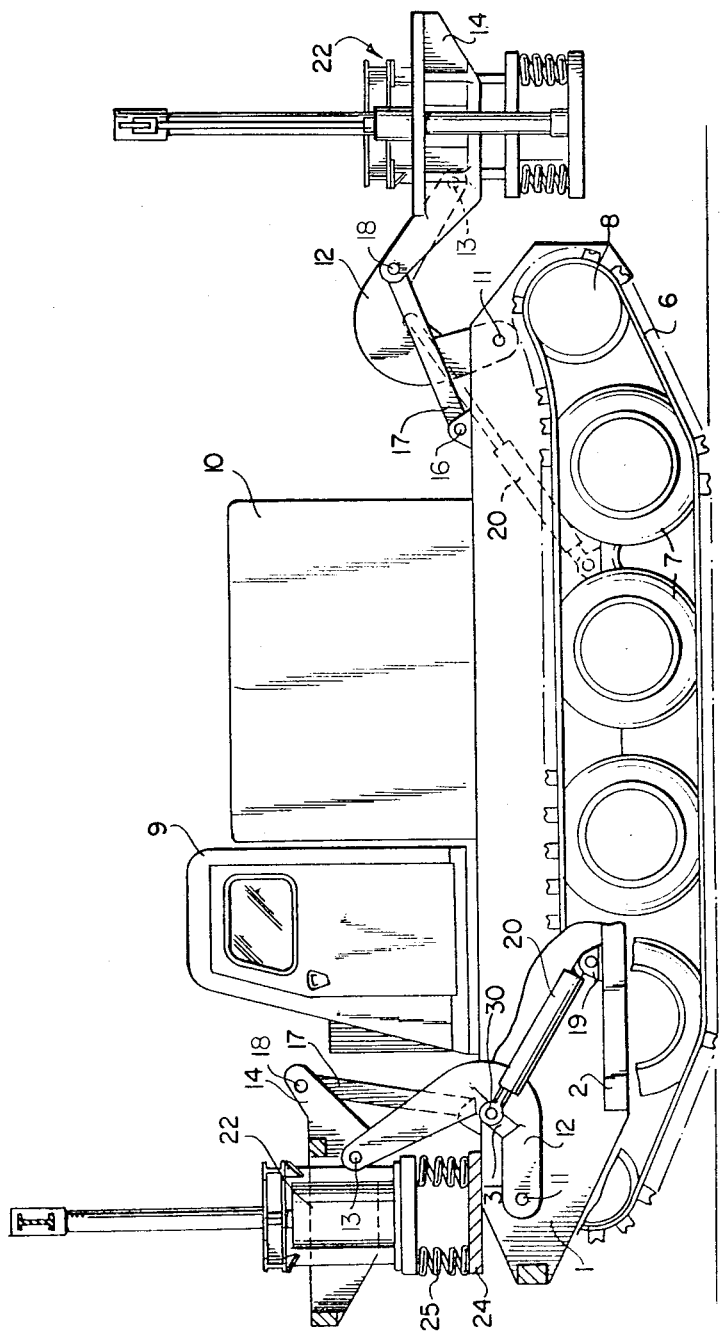
FIG. 2 is an elevation view, partly in cross-section, of a tracked vehicle provided with the embodiment of FIG. 1 and a seismic vibrator assembly.

In order to stow a vibrator in the transporting position on the vehicle, the corresponding base 24 is first elevated to its uppermost position with respect to the supporting brackets 28,28, as shown on the right in FIG. 2. Thereafter, the hydraulic cylinders or rams 20 are operated to retract the pistons thereof within their cylinders thereby causing pivoting of the associated links 12 and 17 and positive and bodily translation of the carrier frame structure and the vibrator upwardly over the end of the vehicle frame until the base 24 sits on the platform 3, as shown on the left in FIG. 2.

The vehicle as described above is operated by sequentially driving the vehicle to a selected site, lowering one or two vibrators on the ground, operating the lowered vibrators, lifting the vibrators, moving a short distance and repeating the sequence. Stowing the vibrators on the platform in transport position is only necessary when moving the vehicle long distance or in crossing difficult terrain. The above sequential operation and the fact that two vibrators may be operated simultaneously instead of only one, constitute major advantages for efficient seismic prospecting.

To maintain the carrier links 14 in always the same angular position relative to the vehicle frame, the pivot axes passing through the pivots 11, 13, 16 and 18 should define the corners of an imaginary parallelogram; that is to say, lines joining pivots 13 to 18 and 11 to 16 respectively must be parallel and of the same length and the same applies to lines joining 11 to 13 and 16 to 18. The goose neck links 12, between pivots 11 and 13, are curved away from the corresponding end of the vehicle. As can be seen at the left of FIG. 2, when the seismic vibrator is retracted toward the stowed position, the curvature of the goose neck links 12 frees a sufficient position of the platform 3 to allow the seismic vibrator to be stowed thereon. It will be readily appreciated that when the seismic vibrator is stowed in such a position, the bending moment on the frame is reduced and the latter does not need to be as strong as when the seismic vibrator is carried by a fixed cantilever projection extending past the end of the ordinary frame structure.

The embodiments of the invention in which an exclusive property or privilege is claimed are defined as follows:

1. In a vehicle having a frame means and adapted for seismic prospecting using at least one seismic vibrator, the combination comprising at least one linkage mechanism including a carrier frame structure constructed and arranged to positively carry said one seismic vibrator for bodily displacement therewith, linkage means pivotally connected to said frame means and to said carrier frame structure and constructed and arranged to positively guide and translate said carrier frame structure relative to said frame means to cause said bodily displacement of said carrier frame structure and said one seismic vibrator, between a position overlying the ground and a position overlying a portion of said frame means, said linkage means being pivotally connected to said carrier frame structure about a first pair of spaced parallel axes and to said frame means about a second pair of spaced parallel axes, said linkage means joining said spaced parallel axes of said first pair to said spaced parallel axes of said second pair respectively, said linkage means also including one linkage arrangement having a first rigid link and a second rigid link each pivotally connected at one end of said carrier frame structure and defining said first pair of spaced parallel axes and at the other end to said frame means and defining said second pair of spaced parallel axes, and an actuator connected to said linkage mechanism and constructed and arranged to actuate said linkage means such that the seismic vibrator mounted on the carrier frame structure can be stowed on said portion of the frame means.

2. A vehicle as defined in claim 1, wherein there is one linkage mechanism at each end of the vehicle and pivotally connected to the corresponding end of the frame means.

3. A vehicle for seismic prospecting as defined in claim 1, wherein said linkage means includes another linkage arrangement having a first rigid link and a second rigid link pivotally connected at one end to said carrier frame structure about said first pair of spaced parallel axes respectively and at the other end to said frame means about said second pair of spaced parallel axes respectively, and said one and said another linkage arrangements are connected on opposite sides respectively of said carrier frame structure.

4. A vehicle for seismic prospecting as defined in claim 1, wherein, on each side of said carrier frame structure, the first and the second rigid links form a parallelogram connection in cooperation with the carrier frame structure and the frame means.

5. A vehicle for seismic prospecting as defined in claim 1, wherein said spaced parallel axes of said first pair extend into a plane which is parallel to the plane which is common to the spaced parallel axes of said second pair whereby said carrier frame structure maintains a constant angular attitude relative to said frame means upon translation relative thereto.

6. A vehicle for seismic prospecting as defined in claim 1, wherein said portion of the frame means includes a cutout portion forming a cavity into one end of the vehicle, one axis of said spaced parallel axes of said second pair extends transversely of said vehicle through said cavity, said first rigid link on each side of said carrier frame structure constitutes a rigid gooseneck link having said other end extending into said cavity, pivoted about said one axis, and constructed and arranged to rest into said cavity under said seismic vibrator when the latter is in said stowed position, and said actuator means is constituted by a pair of hydraulic rams having their opposite ends connected respectively to said gooseneck links and to said frame means.

7. A vehicle for seismic prospecting as defined in claim 1, wherein said vehicle includes a pair of spaced apart tracks extending lengthwise thereof, and arranged to tractively support said frame means, said cavity projects intermediate adjacent ends of said track and said hydraulic rams extend into said cavity.

8. A two-tracked vehicle for seismic prospecting as defined in claim 1, wherein another linkage mechanism is similarly mounted as said one linkage mechanism at the other end of the vehicle.

* * * * *